May 21, 1929.   W. E. DUNN   1,714,467
STORAGE BATTERY GREASE SEALING NUT
Filed Aug. 23, 1923
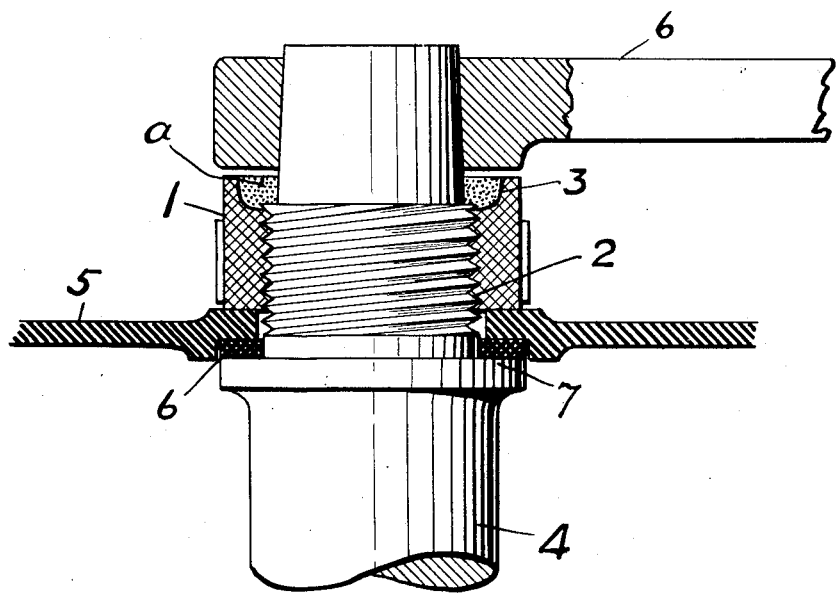
WITNESS:
Rob R Kitchel.
INVENTOR
William E. Dunn
BY
Augustus B. Stoughton.
ATTORNEY Patented May 21, 1929.

1,714,467

UNITED STATES PATENT OFFICE.

WILLIAM E. DUNN, OF WILMETTE, ILLINOIS, ASSIGNOR TO THE ELECTRIC STORAGE BATTERY COMPANY, OF PHILADELPHIA, PENNSYLVANIA, A CORPORATION OF NEW JERSEY.

STORAGE-BATTERY GREASE-SEALING NUT.

Application filed August 23, 1923. Serial No. 658,884.

The principal object of the present invention is to prevent or oppose corrosion of storage battery connectors and terminals and parts thereof such as is due to the action of a film of acid or electrolyte if allowed to form or creep on the surface of the parts. Another object of the invention is to provide for conveniently and comparatively inexpensively applying and retaining at the terminal post a supply of grease useful in effecting the object first mentioned.

Other objects of the invention will appear from the following description at the end of which the invention will be claimed and in which reference will be made to the accompanying drawing which is a view partly in elevation and partly in section illustrating features of the invention.

In the drawings 1 is a storage battery grease sealing nut as of lead alloy and there is formed through it a funnelform opening of which the stem part 2 is threaded and of which the other part 3 provides with the terminal post 4 a grease cavity containing grease $a$. The rim of the part 3 of the funnelform opening is spaced inward from the rim of the nut and the part 3 is shown as spherical in form.

In use the nut 1 is screwed onto the threaded portion of the terminal post 4 and it serves to hold the rubber jar cover 5 and the insulating washer 6 onto a seat 7 provided on the post. The grease $a$ remains in place and performs its function of opposing corrosive action by preventing the formation of a coating or film of electrolyte or acid. It will of course be understood that a connector is applied to the post 4 at its upper end but connectors are too well understood to require further description or illustration.

There is a marked advantage in having the grease cavity 3 combined with the seal nut rather than to use a separate grease retaining device which would involve another part to manufacture and apply. When the intercell connector 6, is in place on the top of the post, it forms a cover over the grease cavity to prevent the collection of dirt and acid on the surface of the grease.

I claim:

1. A storage battery grease sealing nut having through it a funnelform opening of which the stem is screw threaded and of which the other part provides with the terminal post a grease cavity.

2. A storage battery grease sealing nut having through it and spaced inward from its rim a funnelform opening of which the stem part is screw threaded for engagement with a battery terminal post and of which the other part is spherical to provide with the post a grease cavity.

3. In a storage battery the combination of a shouldered terminal-post, a cover, and a screw-threaded nut adapted to engage the post and clamp the cover down onto the shoulder of the post, and said nut having an upwardly projecting rim spaced from the post to form a grease retaining cavity.

4. In a storage battery the combination of a terminal post having a seat, a cover, a screw threaded nut mounted on the post and clamping the cover, a grease cavity provided in part by the post and in part by the upwardly projecting rim forming part of the nut, and grease arranged in the cavity and in contact with the post.

WILLIAM E. DUNN.